(12) United States Patent
Shimada

(10) Patent No.: US 9,247,126 B2
(45) Date of Patent: Jan. 26, 2016

(54) IMAGE PICKUP DEVICE AND FOCUS DETECTION APPARATUS

(71) Applicant: OLYMPUS CORPORATION, Tokyo (JP)

(72) Inventor: Yoshinao Shimada, Hino (JP)

(73) Assignee: OLYMPUS CORPORATION (JP)

( * ) Notice: Subject to any disclaimer, the term of this patent is extended or adjusted under 35 U.S.C. 154(b) by 0 days.

(21) Appl. No.: 14/286,001

(22) Filed: May 23, 2014

(65) Prior Publication Data

US 2015/0022699 A1 Jan. 22, 2015

(30) Foreign Application Priority Data

Jul. 16, 2013 (JP) ................... 2013-147833

(51) Int. Cl.
*H04N 5/232* (2006.01)
*H04N 5/369* (2011.01)
*H04N 5/3745* (2011.01)

(52) U.S. Cl.
CPC ......... *H04N 5/23212* (2013.01); *H04N 5/3696* (2013.01); *H04N 5/37452* (2013.01)

(58) Field of Classification Search
CPC ... H04N 5/23212; H04N 5/3696; G02B 7/28; G02B 7/36
USPC ............................... 348/345–356; 396/79–82
See application file for complete search history.

(56) References Cited

U.S. PATENT DOCUMENTS

| | | | | |
|---|---|---|---|---|
| 2009/0135289 | A1* | 5/2009 | Kusaka | 348/345 |
| 2013/0201383 | A1* | 8/2013 | Okado | G02B 7/34 348/345 |
| 2014/0285706 | A1* | 9/2014 | Theuwissen | 348/350 |
| 2014/0293119 | A1* | 10/2014 | Hamano | H04N 5/23212 348/350 |
| 2015/0237282 | A1* | 8/2015 | Shimada | H04N 5/378 348/297 |

FOREIGN PATENT DOCUMENTS

JP     2009-060597     3/2009

* cited by examiner

*Primary Examiner* — Mekonnen Dagnew
(74) *Attorney, Agent, or Firm* — Ostrolenk Faber LLP

(57) ABSTRACT

An image pickup device includes pixels arranged in a matrix shape, vertical signal lines to which the pixels are respectively connected via normal connection lines for each column, focus detection pixels discretely arranged among the pixels, focus connection lines that set, in a range in which a total number of the focus detection pixels included in a row group including a plurality of rows is not more than a number of the vertical signal lines, the row group and respectively connect all the focus detection pixels included in the row group to the different vertical signal lines, focus readout switches respectively provided on the focus connection lines, and a vertical scanning circuit that causes the focus readout switches to simultaneously operate by a unit of the row group.

8 Claims, 11 Drawing Sheets

IMAGE PICKUP DEVICE AND FOCUS DETECTION APPARATUS

CROSS REFERENCE TO RELATED APPLICATION

This application claims benefit of Japanese Application No. 2013-147833 filed in Japan on Jul. 16, 2013, the entire contents of which are incorporated herein by this reference.

BACKGROUND OF THE INVENTION

1. Field of the Invention

The present invention relates to an image pickup device including focus detection pixels, and a focus detection apparatus including the image pickup device.

2. Description of the Related Art

In recent years, to detect a phase difference occurring depending on a deviation from a focus position, development of an image pickup device including focus detection pixels that have been pupil-divided has been put to practical use and commercialized. Such an image pickup device includes one described in Japanese Patent Application Laid-Open Publication No. 2009-60597, for example.

In an image pickup device currently put to practical use, a relatively small number of focus detection pixels are only arranged in a relatively narrow specific range within its screen, and an arrangement ratio (density) of the focus detection pixels is approximately 0.5%, for example.

On the other hand, to enhance focus detection performance, a large number of focus detection pixels are desirably arranged at a higher density (or further in a wider range).

SUMMARY OF THE INVENTION

According to an aspect of the present invention, an image pickup device, which includes a plurality of pixels arranged in a matrix shape, includes a plurality of vertical signal lines, respectively provided to correspond to all columns, to each of which the pixels in one of the columns are connected, respectively, via normal connection lines, a plurality of focus detection pixels discretely arranged among the plurality of pixels arranged in a matrix shape, focus connection lines, different from the normal connection lines, which set, in a range in which a total number of the focus detection pixels included in a row group including a plurality of rows is not more than a number of the vertical signal lines, the row group and respectively connect all the focus detection pixels included in the row group to the different vertical signal lines, focus readout switches respectively provided on the focus connection lines, and a vertical scanning circuit that causes the focus readout switches to simultaneously operate by a unit of the row group.

According to another aspect of the present invention, a focus detection apparatus includes the image pickup device according to the first aspect, and a focus detection unit that detects a focus based on signals read out of the focus detection pixels in the image pickup device.

DETAILED DESCRIPTION OF THE PREFERRED EMBODIMENTS

An embodiment of the present invention will be described below with reference to the drawings.

Embodiment 1

Figure 1:
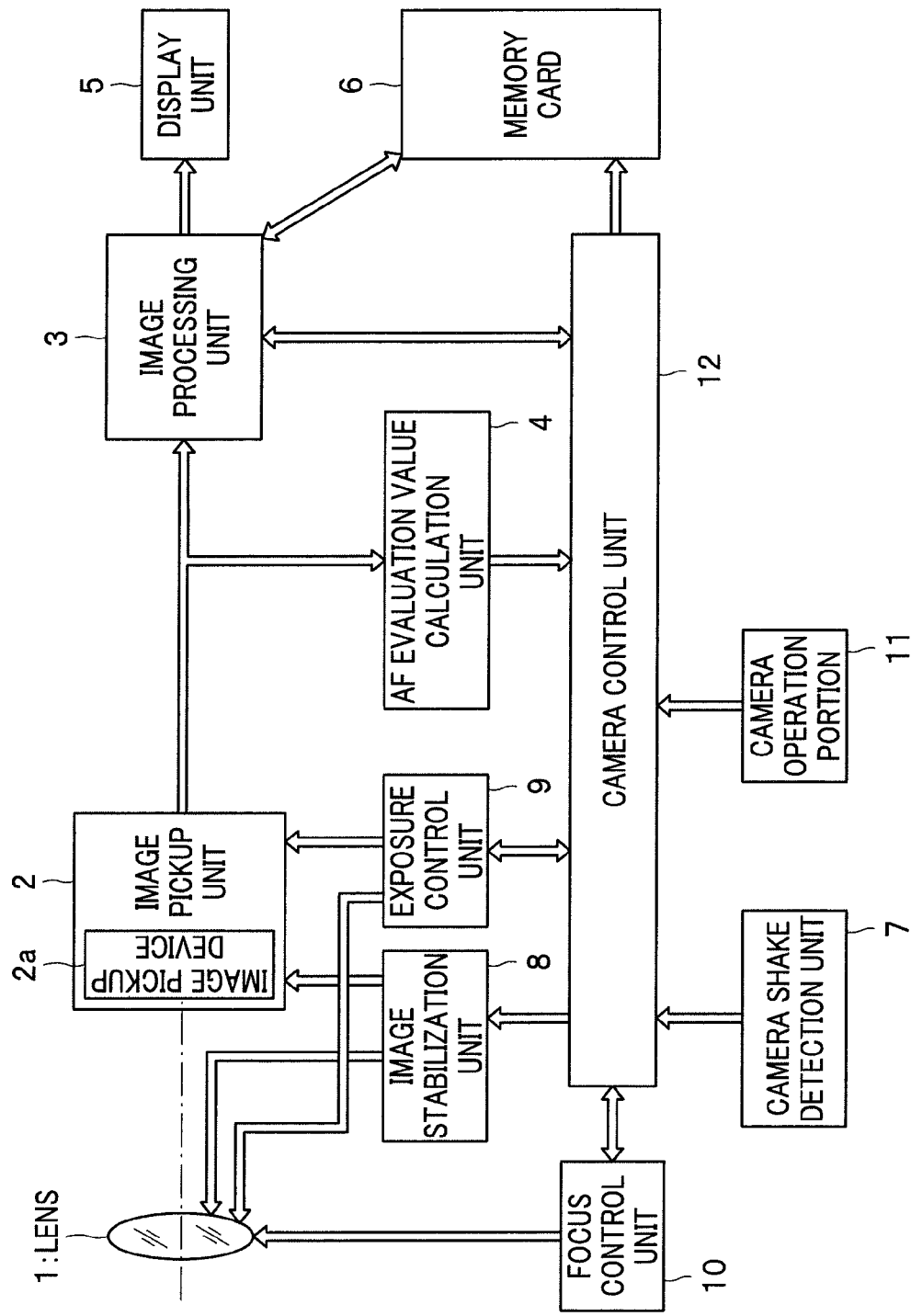
FIG. 1 is a block diagram illustrating a configuration of an image pickup apparatus according to an embodiment 1 of the present invention.

FIGS. 1 to 12 illustrate an embodiment 1 of the present invention, where FIG. 1 is a block diagram illustrating a configuration of an image pickup apparatus.

As shown in FIG. 1, the image pickup apparatus includes a lens 1, an image pickup unit 2, an image processing unit 3, an AF (automatic focus) evaluation value calculation unit 4, a display unit 5, a camera shake detection unit 7, an image stabilization unit 8, an exposure control unit 9, a focus control unit 10, a camera operation portion 11, and a camera control unit 12. Note that although also described in FIG. 1, a memory card 6 need not be a component specific to the image pickup apparatus because it is detachably attached to the image pickup apparatus.

The lens 1 forms an optical image of an object on an image pickup area in an image pickup device 2a included in the image pickup unit 2. The lens 1 includes a focus lens for adjusting a focal position to perform focusing and a diaphragm for controlling a range of a light flux that passes therethrough, and further has an image stabilization function in the present embodiment.

The image pickup unit 2 includes the image pickup device 2a that photoelectrically converts the optical image of the object formed by the lens 1 and outputs the photoelectrically converted optical image as an image signal. Note that in the present embodiment, the image pickup device 2a includes a circuit (a column parallel AD converter 23, described below) that converts an analog image signal obtained by the photoelectric conversion into a digital signal. Although described as being a color image pickup device (see FIG. 4) including color filters in a primary color Bayer array, the image pickup device 2a may have another configuration. The image pickup unit 2 is movable within a plane perpendicular to a shooting optical axis of the lens 1, and has an image stabilization function.

The image processing unit 3 performs various types of image processing for the image signal outputted from the image pickup unit 2. The image processing unit 3 also performs processing for performing interpolation calculation for a pixel value of a focus detection pixel, described below, in the image pickup device 2a based on pixel values of normal pixels in the vicinities of the focus detection pixel.

The AF evaluation value calculation unit 4 calculates an AF evaluation value based on the image signal outputted from the image pickup unit 2, and outputs the calculated AF evaluation value to the camera control unit 12. More specifically, the AF evaluation value calculation unit 4 calculates a phase difference based on a signal read out of the focus detection pixel in the image pickup device 2a, and outputs the calculated phase difference as the AF evaluation value. Note that the AF evaluation value calculation unit 4 may further calculate a contrast value based on the image signal outputted from the image pickup device 2a, and output the calculated contrast value as the AF evaluation value (i.e., contrast AF may be further performed in addition to phase difference AF).

The display unit 5 displays an image based on the image signal that has been subjected to the image processing for display by the image processing unit 3. The display unit 5 displays a live view and a still image while also displaying various types of information relating to the image pickup apparatus.

The memory card 6 is a recording medium for storing the image signal that has been subjected to the image processing for recording by the image processing unit 3.

The camera shake detection unit 7 includes an acceleration sensor and the like, detects a camera shake of the image pickup apparatus and outputs the detected camera shake to the camera control unit 12.

The image stabilization unit 8 moves at least one of the lens 1 and the image pickup unit 2 so that the detected camera shake is canceled based on control of the camera control unit 12, and reduces the occurrence of an influence of the camera shake in an optical object image to be formed on the image pickup area in the image pickup device 2a.

The exposure control unit 9 also controls a device shutter of the image pickup device 2a (the device shutter includes a global shutter, i.e., a shutter that starts exposure for shooting by collectively resetting all pixels in the image pickup device 2a and ends the exposure by collectively transferring pixel signals of all the pixels after a predetermined exposure time period has elapsed) under the control of the camera control unit 12, to acquire an image. Further, the exposure control unit 9 also controls the diaphragm included in the lens 1 based on an aperture value determined by the camera control unit 12. The camera control unit 12 determines a shutter speed and the aperture value based on a program diagram along an additive system of photographic exposure (APEX), for example, using photometric data calculated based on the image signal outputted from the image pickup unit 2, sensitivity set by the camera operation portion 11, and the like. The exposure control unit 9 outputs driving information of the image pickup device 2a to the camera control unit 12.

The focus control unit 10 drives the lens 1 to adjust a focus. That is, the focus control unit 10 drives the focus lens included in the lens 1 based on the control of the camera control unit 12, which has received the AF evaluation value from the AF evaluation value calculation unit 4, so that the object image to be formed on the image pickup device 2a is focused. Thus, the AF evaluation value calculation unit 4, the camera control unit 12, and the focus control unit 10 constitute a focus detection unit that detects a focus based on the signal read out of the focus detection pixel in the image pickup device 2a (therefore, the image pickup apparatus according to the present embodiment has a function of a focus detection apparatus). The focus control unit 10 outputs lens driving information such as a lens position to the camera control unit 12.

The camera operation portion 11 is an operation portion for performing various types of operation inputs to the image pickup apparatus. The camera operation portion 11 includes operation members such as a power switch for turning on/off power to the image pickup apparatus, a release button for inputting an instruction to pick up a still image and a moving image, and a mode button for setting a still image shooting mode, a moving image shooting mode, and a live view mode.

The camera control unit 12 controls the entire image pickup apparatus including the image processing unit 3, the memory card 6, the image stabilization unit 8, the exposure control unit 9, and the focus control unit 10 based on the lens driving information from the focus control unit 10, the AF evaluation value from the AF evaluation value calculation unit 4, the driving information from the exposure control unit 9, the processing information from the image processing unit 3, information about the camera shake from the camera shake detection unit 7, the operation input from the camera operation portion 11, and the like.

Figure 2:
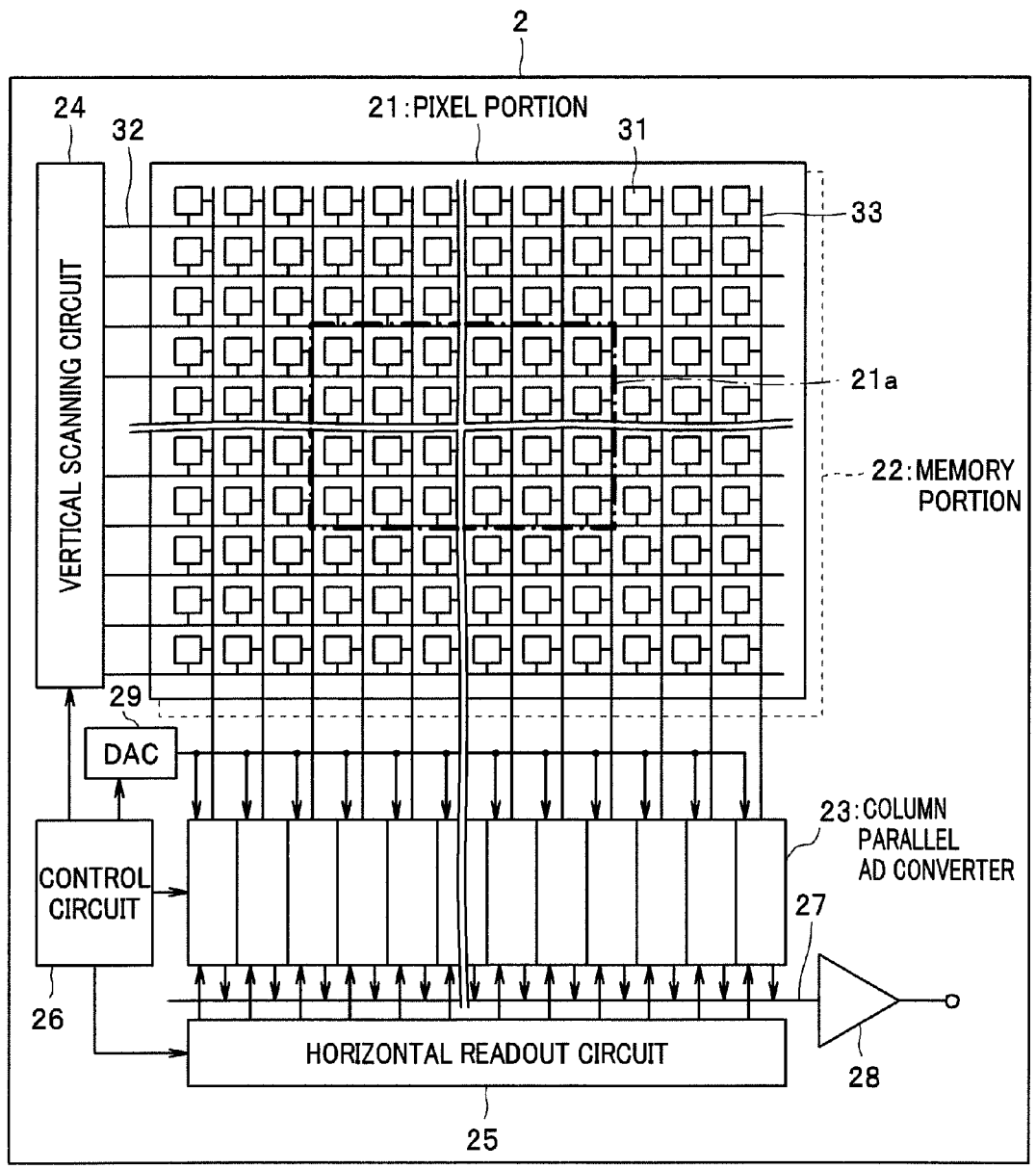
FIG. 2 is a diagram illustrating a configuration of an image pickup unit in the embodiment 1.

Then, FIG. 2 is a diagram illustrating a configuration of the image pickup unit 2.

The image pickup unit 2 includes a pixel portion 21 including a plurality of pixels 31, a memory portion 22, the column parallel AD converter 23, a vertical scanning circuit 24, a horizontal readout circuit 25, a control circuit 26, a horizontal signal line 27, a sense amplifier circuit 28, and a digital analog converter (DAC) 29. Note that while the image pickup device 2a in the image pickup unit 2 includes at least the pixel portion 21 and the vertical scanning circuit 24, the other circuit elements may be inside or outside the image pickup device 2a. However, each of the elements in the image pickup unit 2 illustrated in FIG. 2 will be described below as being included in the image pickup device 2a. An arrangement position of each of the circuit elements illustrated in FIG. 2 does not necessarily match an actual arrangement position.

The pixel portion 21 is an image pickup area where the plurality of pixels 31, which respectively generate signal charges depending on an amount of exposure, are arranged in a matrix shape. An arrangement in a row direction of the pixels 31 in the pixel portion 21 is referred to as a "row" or a "line", and an arrangement in a column direction is referred to as a "column". The row direction is also referred to as a horizontal direction, and the column direction is also referred to as a vertical direction.

The memory portion 22 temporarily stores the signal charge generated by each of the pixels 31 arranged in the pixel portion 21, and includes memories m1 (see FIGS. 6 and 7) that are the same in number and arrangement as the pixels 31 arranged in the pixel portion 21, for example. The memory portion 22 is stacked in a thickness direction of a substrate on the pixel portion 21, for example, as its configuration. Since a case where the memory portion 22 is thus configured is considered in the present embodiment, description is made, assuming that the memory portion 22 is included in the pixel portion 21.

The vertical scanning circuit 24 includes a shift register, for example, and performs exposure control of all the pixels 31 arranged in the pixel portion 21 simultaneously (with a global shutter), for example, to transfer the pixel signals of all the pixels 31, respectively, to the memories m1 arranged in the memory portion 22 and performs readout control of the memories m1 arranged in the memory portion 22 in units of rows (or in units of row groups, described below), for example. Control signal lines 32 are connected to the vertical scanning circuit 24 for each row so that control signals to the pixel portion 21 and the memory portion 22 are outputted independently for each row. For example, the vertical scanning circuit 24 simultaneously resets all the pixels 31 in the pixel portion 21 and simultaneously transfers the pixel signals of all the pixels 31, respectively, to the memories m1 in the memory portion 22 when it performs a global shutter operation. For example, the vertical scanning circuit 24 performs control to cause all focus readout switches, described below, included in one row group (line group) (e.g., focus readout switches SW4-1 and SW4-4 in a row group including the first to sixth rows or focus readout switches SW4-7 and SW4-10 in a row group including the seventh to 12-th rows in FIG. 5) to simultaneously operate and respectively output the pixel signals from the memories m1 to vertical signal lines 33 for the row group, when performing readout control on the memories m1 to acquire information only on the focus detection pixels by the unit of the row group at high speed. The vertical signal lines 33 are provided to respectively correspond to columns of all the pixels 31.

The column parallel AD converter 23 performs signal processing such as noise removal and amplification for the pixel signals respectively outputted for each column from the memories m1 in the memory portion 22 via the vertical signal lines 33. The column parallel AD converter 23 also performs processing for converting an analog pixel signal to a digital signal, and simultaneously converts analog pixel signals transmitted via all the vertical signal lines 33 into digital signals.

The DAC 29 converts the digital signal to be outputted for the control circuit 26 to control the column parallel AD converter 23 into an analog signal.

The horizontal readout circuit 25 includes a shift register, for example, and sequentially selects ADCs 30 (see FIG. 3), described below, in the column parallel AD converter 23 relating to the pixel column from which pixel signals are to be read out and sequentially outputs the pixel signals to the horizontal signal line 27 from the column parallel AD converter 23, to read out the pixel signals.

The sense amplifier circuit 28 performs signal processing such as amplification for the pixel signals outputted to the horizontal signal line 27.

The control circuit 26 generates control signals such as a clock signal used as an operation reference, a vertical synchronizing signal VD (see, e.g., FIGS. 8, 11, and 12), and a horizontal synchronizing signal HD (see, e.g., FIGS. 11 and 12) under the control of the exposure control unit 9, to control the column parallel AD converter 23, the vertical scanning circuit 24, the horizontal readout circuit 25, the DAC 29, and the like, described above.

Figure 3:
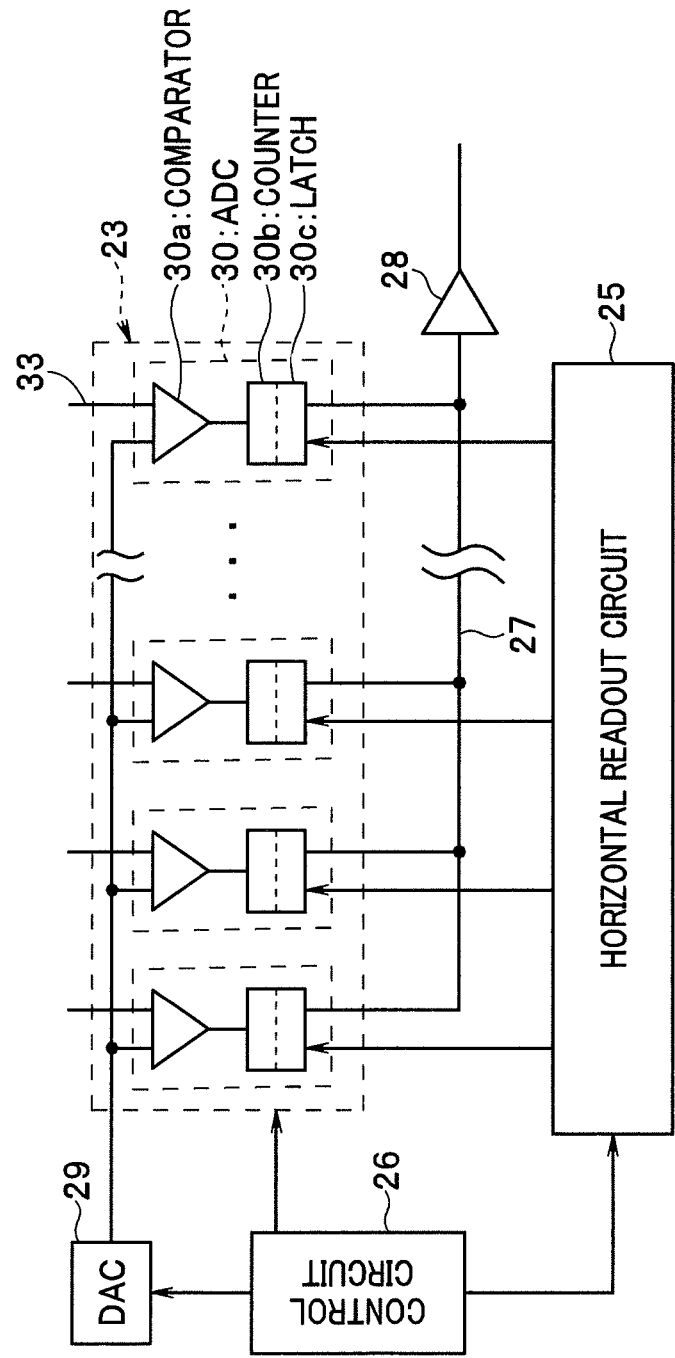
FIG. 3 is a diagram illustrating a configuration of a column parallel AD converter provided in the image pickup unit in the embodiment 1.

Then, FIG. 3 is a diagram illustrating a configuration of the column parallel AD converter 23 provided in the image pickup unit 2.

The column parallel AD converter 23 includes the plurality of ADCs 30 provided to respectively correspond to the vertical signal lines 33.

The ADC 30 includes a comparator 30a, a counter 30b, and a latch 30c.

The above-mentioned DAC 29 outputs a reference voltage to the comparator 30a based on the control signals from the control circuit 26. The reference voltage outputted by the DAC 29 is a voltage having a lamp waveform that changes in a slope shape.

The comparator 30a compares, when an analog pixel signal is inputted thereto from the vertical signal line 33, a voltage of the inputted pixel signal with the reference voltage. The comparator 30a reverses an output signal when a large/small relationship between the voltage of the pixel signal and the reference voltage is reversed. The comparator 30a has a configuration of a general differential amplifier including a plurality of P-channel metal oxide semiconductor (PMOS) transistors and a plurality of N-channel metal oxide semiconductor (NMOS) transistors, for example, and consumes power during an operation. Capacitors for storing a reset level (a reset noise), not illustrated, are respectively connected to a part, to which a signal line from the DAC 29 is connected and a part, to which the vertical signal line 33 is connected, of the comparator 30a. The capacitors are reset in response to an instruction signal from the control circuit 26.

The counter 30b digitally counts a period of time elapsed until the output signal from the comparator 30a is reversed, i.e., a period of time elapsed until the large/small relationship between the reference voltage having a lamp waveform and the voltage of the pixel signal (a comparison time period) as the number of input clocks, for example.

The latch 30c functions as a digital memory that stores a counting result by the counter 30b, and is connected to the sense amplifier circuit 28 via the horizontal signal line 27, for example. The latch 30c is connected to the horizontal readout circuit 25, and outputs, when a control signal is inputted thereto by being selected by the horizontal readout circuit 25, a stored digital signal.

Figure 4:
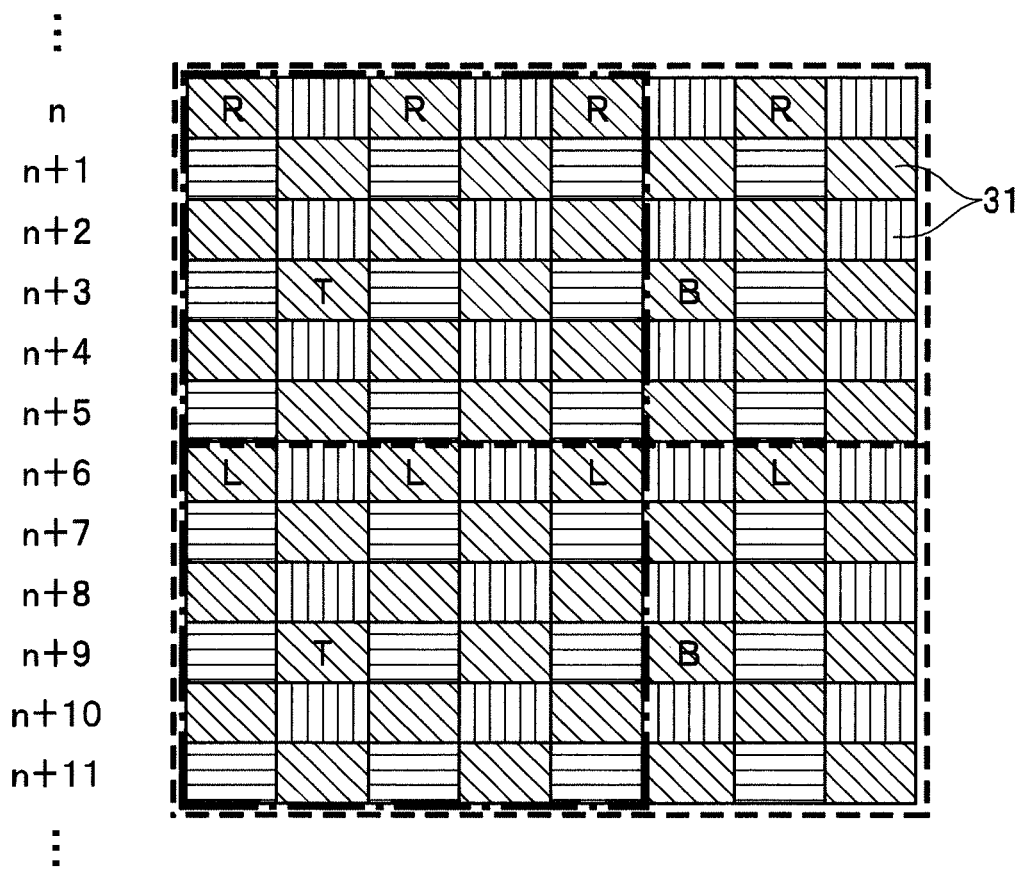
FIG. 4 is a diagram illustrating an example of a pixel arrangement of focus detection pixels in the embodiment 1.

Then, FIG. 4 is a diagram illustrating an example of a pixel arrangement of focus detection pixels.

The pixels 31 arranged in the pixel portion 21 include normal pixels for picking up an object image and focus detection pixels for performing focus detection based on a phase difference. The focus detection pixels in the present embodiment include a focus detection pixel R for photoelectrically converting a light beam that passes through the right side of a pupil of the lens 1, a focus detection pixel L for photoelectrically converting a light beam that passes through the left side thereof, a focus detection pixel T for photoelectrically converting a light beam that passes through the upper side thereof, and a focus detection pixel B for photoelectrically converting a light beam that passes through the lower side thereof. A phase difference in the horizontal direction (row direction) is detected based on an image obtained by the focus detection pixel R and an image obtained by the focus detection pixel L, and a phase difference in the vertical direction (column direction) is detected based on an image obtained by the focus detection pixel T and an image obtained by the focus detection pixel B. Note that focus detection pixels for detecting a phase difference in not only the horizontal direction and the vertical direction but also a right oblique direction, a left oblique direction, or another direction may be provided. Thus, the phase differences in not only the horizontal direction but also the directions other than the horizontal direction are also made detectable to enhance focus detection performance.

Each of the above-mentioned focus detection pixels R, L, T, and B includes a plurality of focus detection pixels discretely arranged among the plurality of pixels 31 arranged in a matrix shape within the focus detection area 21a illustrated in FIG. 2 in the pixel portion 21. The focus detection area 21a is set near the center of the image pickup area in the image pickup device 2a.

More specifically, the focus detection pixels are arranged within the focus detection area 21a using an arrangement pattern of 12 rows by eight columns, as illustrated in FIG. 4, for example, as a minimum repeating unit so that the minimum repeating unit is spread thereover. Note that in FIG. 4, hatching by oblique lines from the upper left to the lower right, hatching by vertical lines, and hatching by horizontal lines respectively represent a green pixel, a red pixel, and a blue pixel.

In the arrangement pattern illustrated in FIG. 4, the focus detection pixels include focus detection pixels with a ratio of one to two (the focus detection pixels R or L) and focus detection pixels with a ratio of one to four (the focus detection pixels T and B that are not distinguished) alternately arranged in the horizontal direction at only positions of the green pixels in the primary color Bayer array (however, there are lines where the green pixels are arranged but the focus detection pixels R, L, T, and B are not arranged). On a line where the focus detection pixels R are arranged, the other focus detection pixels L, T, and B are not arranged. On a line where the focus detection pixels L are arranged, the other focus detection pixels R, T, and B are not arranged. The focus detection pixels T and B are not arranged in the same column. Further, in the vicinity of the line where the focus detection pixels R are arranged, a line where the focus detection pixels L are arranged to be paired therewith. The focus detection pixels R and L, which are paired with each other, are arranged in the same column. In addition, the focus detection pixel B is arranged at a position shifted by four pixels rightward from the focus detection pixel T.

Since a pixel value of the green pixel at each of positions of the focus detection pixels R, L, T, and B is interpolated by referring to pixel values of the green pixels in the vicinities thereof when image processing is performed, the green pixels (other than the focus detection pixels R, L, T, and B) are arranged at two or more of the positions of the four green pixels in the vicinities on the top, bottom, left, and right of any one of the focus detection pixels R, L, T, and B.

More specifically, in the arrangement pattern illustrated in FIG. 4, when n is an integer, the focus detection pixels R, the focus detection pixels L, and the focus detection pixels T and B are respectively arranged on the n-th line, the (n+6)-th line, and the (n+3)-th and (n+9)-th lines. None of the focus detection pixels R, L, T, and B is arranged on the (n+1)-th, (n+2)-th, (n+4)-th, (n+5)-th, (n+7)-th, (n+8)-th, (n+10)-th, and (n+11)-th lines.

In the arrangement pattern illustrated in FIG. 4, 12 focus detection pixels are included in 96 pixels (12 pixels in length by 8 pixels in width). Thus, the ratio of the focus detection pixels is 12.5%. On the other hand, the ratio of the conventional focal distance detection pixels is approximately 0.5%, for example. Thus, the number of focus detection pixels is significantly improved.

Figure 5:
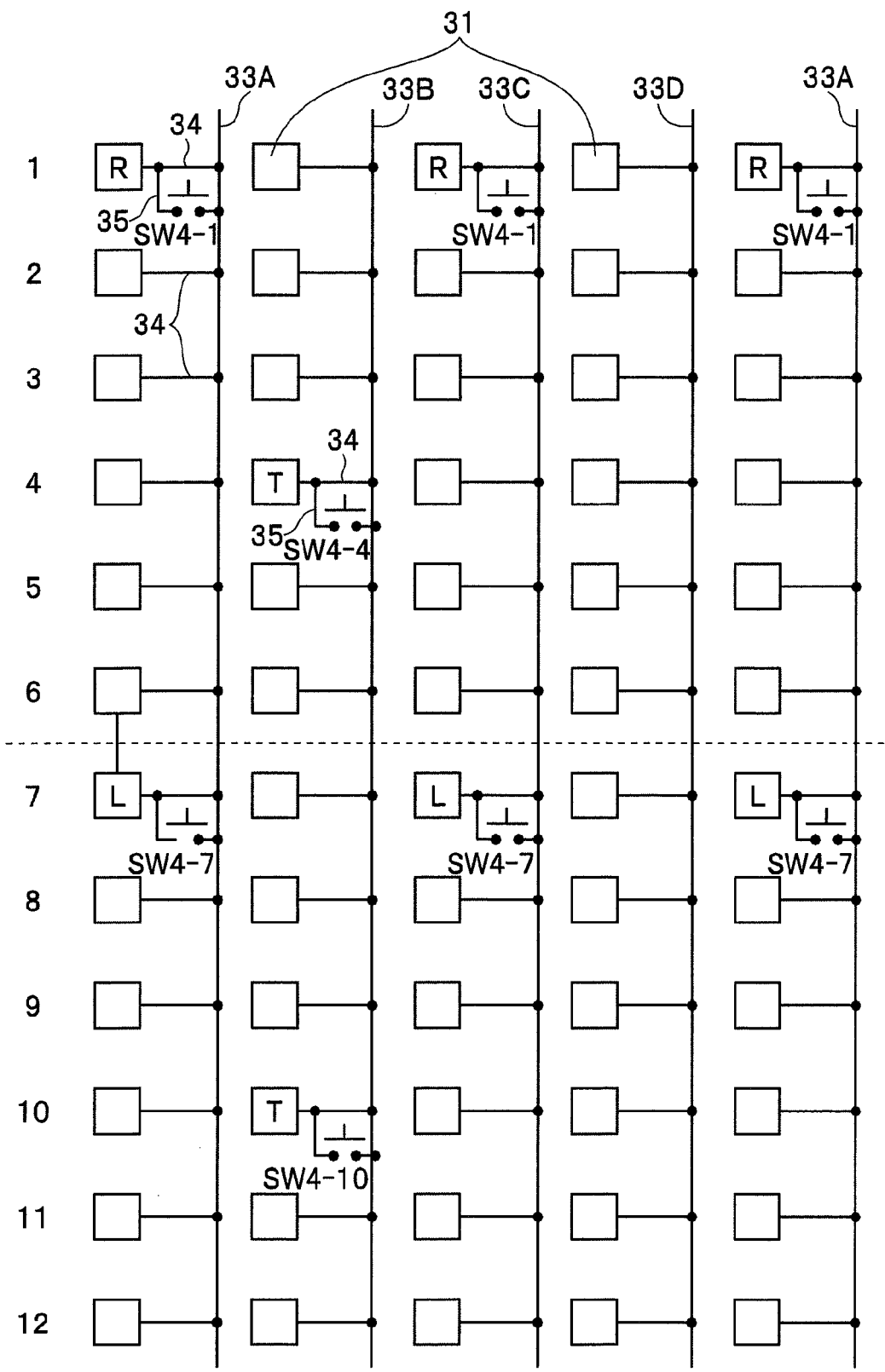
FIG. 5 is a diagram illustrating a configuration of connection of focus detection pixels to vertical signal lines in the embodiment 1.
Figure 6:
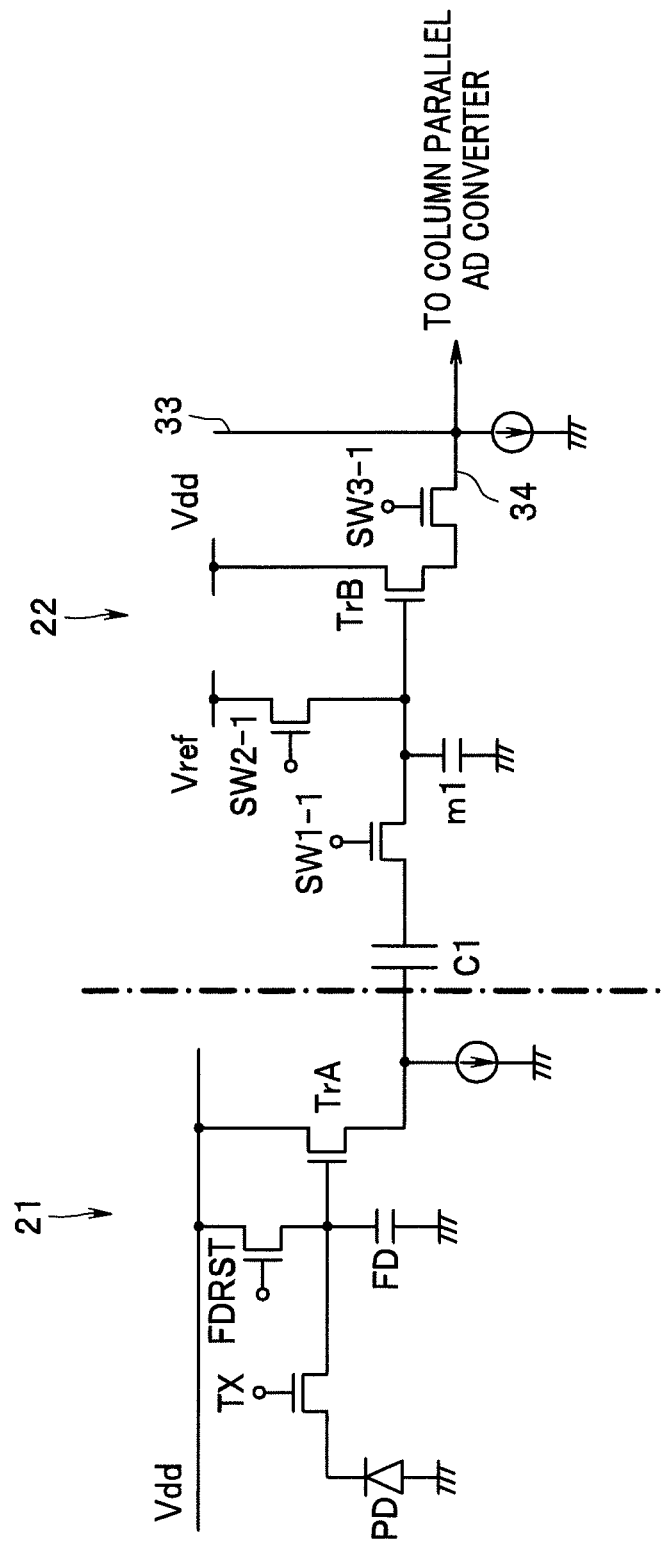
FIG. 6 is a circuit diagram illustrating a configuration of a pixel portion and a memory portion relating to one of normal pixels in the embodiment 1.
Figure 7:
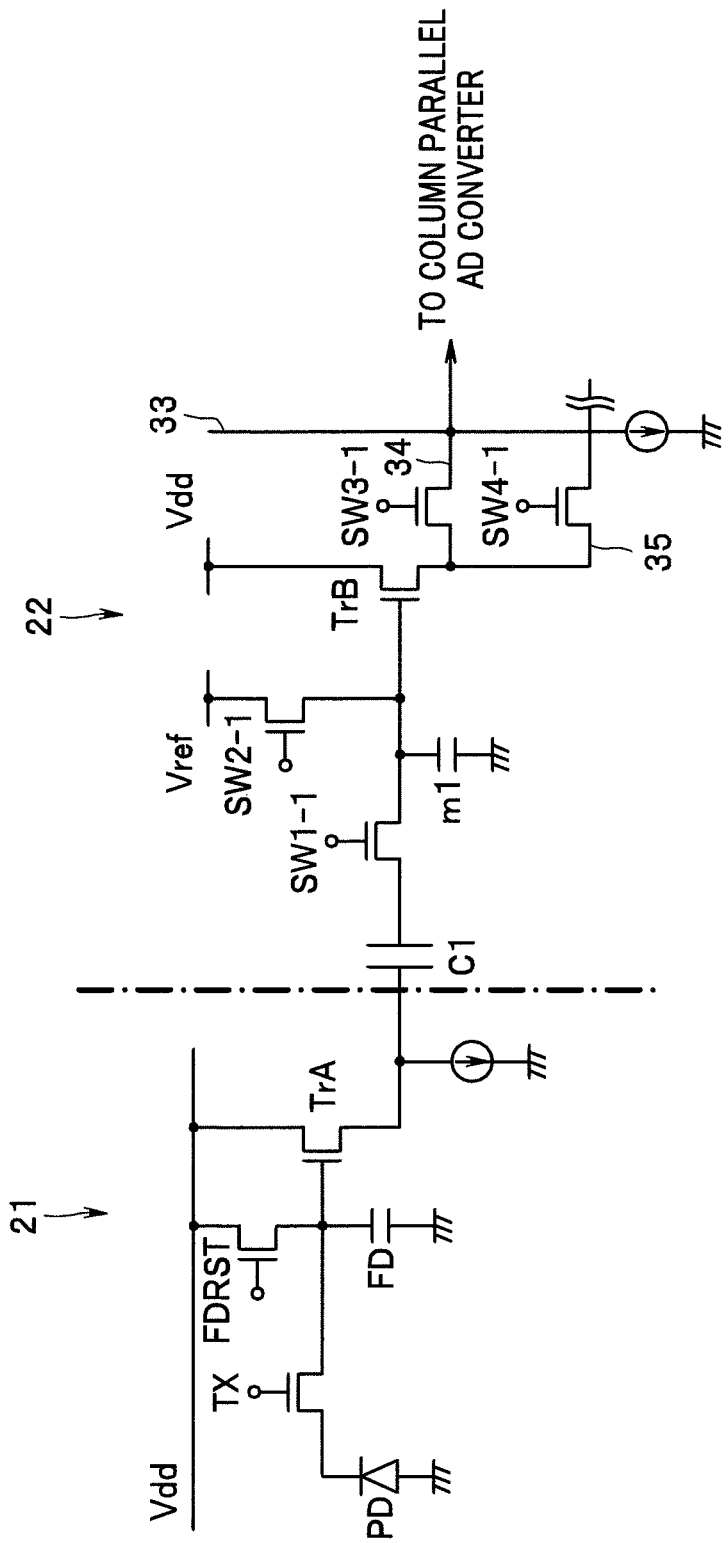
FIG. 7 is a circuit diagram illustrating a configuration of a pixel portion and a memory portion relating to one of focus detection pixels in the embodiment 1.

FIG. 5 is a diagram illustrating a configuration of connection of the focus detection pixels to the vertical signal line 33, FIG. 6 is a circuit diagram illustrating a configuration of the pixel portion 21 and the memory portion 22 relating to one of the normal pixels, and FIG. 7 is a circuit diagram illustrating a configuration of the pixel portion 21 and the memory portion 22 relating to one of the focus detection pixels.

Note that FIG. 5 illustrates relative line numbers when the line number n illustrated in FIG. 4 is taken as 1 on the left side thereof. FIGS. 6 and 7 respectively illustrate configurations of the pixel portion 21 and the memory portion 22 when the relative line number is 1. A hyphen in a switch SWn-m (n and m are integers) followed by an auxiliary sign representing a line number (or a relative line number). Thus, the switch SWn-m is abbreviated as a switch SWn, as needed, when the line number does not matter.

FIG. 5 illustrates a configuration of connection of each of the pixels 31 in a portion surrounded by a one-dot and dash line in FIG. 4 to the vertical signal line 33. The vertical signal lines 33 are sequentially assigned auxiliary signs A to D, respectively, to be vertical signal lines 33A to 33D to correspond to an alternate arrangement of the focus detection pixels with a ratio of one to two and the focus detection pixels with a ratio of one to four in the horizontal direction.

As illustrated in FIG. 5, any one of the normal pixels and the focus detection pixels R, L, T, and B is connected to the vertical signal line 33 via a normal connection line 34. Each of the focus detection pixels R, L, T, and B is further connected to the vertical signal line 33 via a focus connection line 35 different from the normal connection line 34. A switch SW4-m serving as a focus readout switch is disposed on the focus connection line 35. Note that a switch SW3-m serving as a normal readout switch is also disposed, as illustrated in FIGS. 6 and 7, on the normal connection line 34, although not illustrated in FIG. 5.

While the normal connection lines 34 respectively connect the pixels in one column adjacent to the left side thereof, for example, to the vertical signal line 33, the focus connection lines 35 respectively connect the focus detection pixels included in one row group to be read out at a time to the different vertical signal lines 33 so that signals of the focus detection pixels in the one row group are not mixed. Therefore, the focus detection pixels are not necessarily connected, respectively, to the adjacent vertical signal lines 33 via the focus connection lines 35. While an example in which the focus detection pixels are respectively connected to the adjacent vertical signal lines 33 is illustrated in the present embodiment, as described below, when the focus detection pixels are respectively connected to the vertical signal lines 33 so that the signals of the focus detection pixels are not mixed, the adjacent signal lines 33 are not always empty lines. This can vary depending on an arrangement pattern of the focus detection pixels.

More specifically, each of a first row group including the first to sixth rows and a second row group including the seventh to 12-th lines, which are separated by a dotted line in the example illustrated in FIGS. 4 and 5, within the minimum repeating unit including the 12 rows is read out at a time during focus detection. That is, all the focus detection pixels in the minimum repeating unit are read out at two times.

As for the first readout, for example, when the focus detection pixels R in the first row are respectively connected to the vertical signal lines 33A and 33C, and the focus detection pixel T or B in the fourth row is connected to the vertical signal line 33B, the unconnected vertical signal line 33 is only the vertical signal line 33D. All the focus detection pixels L in the succeeding seventh row cannot be connected to the unconnected vertical signal line 33D because they are arranged at a ratio of one to two in the horizontal direction. Therefore, the first row to the sixth row preceding the seventh row constitute the first row group.

Thus, switches for respectively selecting the focus detection pixels are newly disposed so that the focus detection pixels arranged in the plurality of rows can simultaneously be read out. As described above, the vertical signal lines 33 include the vertical signal line 33D to which the focus detection pixels in the first row group are not respectively connected via the switches SW4. That is, the vertical signal line 33D is not used when only the focus detection pixels in the first row group are read out. Therefore, in design, another focus detection pixel is further added and connected to the unconnected vertical signal line 33D so that there is room for further improvement of a readout speed. Wiring of the focus connection line 35 may become complicated by connecting the focus detection pixel to the vertical signal line 33 not adjacent thereto, for example, and a reconfiguration of the pixel arrangement during image processing after readout may be required. However, other focus detection pixels may further respectively be connected to all the unconnected vertical signal lines 33D so that the readout speed is further improved.

In the second row group relating to the second readout, the focus detection pixels are connected to any one of the vertical signal lines 33A to 33D so that their signals are not mixed, like in the first row group.

If the focus detection pixels are thus alternately arranged at a ratio of one to two and at a ratio of one to four in the horizontal direction, when only the lines where the focus detection pixels are arranged are counted, a pixel group may be divided for two or less rows ("two" corresponds to "two" for the most dense lines on which the focus detection pixels are arranged at the highest density, i.e., the most dense lines where the focus detection pixels are arranged at a ratio of one to two out of the plurality of lines where the focus detection pixels are arranged) (e.g., the first to sixth lines, the seventh to 12-th lines, . . . including lines where only the normal pixels are arranged).

Further, while an example in which the focus detection pixels are alternately arranged at a ratio of one to two and at a ratio of one to four in the horizontal direction has been described above, a similar idea can also be applied more generally to a case where the focus detection pixels are arranged at a ratio of one to n on the most dense line. In this case, when only lines where the focus detection pixels are arranged are counted, a pixel group may be divided for n or less rows (e.g., the first to n-th lines, the (n+1)-th to 2n-th lines, the (2n+1)-th to 3n-th lines, . . . so that the lines where the focus detection pixels are arranged are included).

In addition, the arrangement ratio of the focus detection pixels in the horizontal direction may not be constant. In this case, a row group may be set in a range in which the total number of the focus detection pixels included in a row group including a plurality of rows is not more than the number of the vertical signal lines 33, and all the focus detection pixels included in the row group may be respectively connected to the different vertical signal lines via the focus connection lines 35. In this case, the row group preferably takes the maximum value in a range in which the total number of the focus detection pixels included in the row group is not more than the number of the vertical signal lines 33 from a viewpoint of minimizing the number of times of readout to attain higher efficiency (e.g., shortening of a readout time and reduction of power consumption required for readout). The row group preferably includes a plurality of continuous rows to avoid useless complexity. Further, in circuit design, the focus connection lines 35 are preferably set so that the total length of the focus detection lines 35 (the sum of the lengths of all the focus connection lines 35) becomes the shortest.

An example of a circuit configuration relating to the normal pixels will be described below with reference to FIG. 6.

The pixel 31 in the pixel portion 21 includes a photodiode (PD) serving as a photoelectric conversion portion and a floating diffusion (FD) serving as a signal storage portion that temporarily stores a signal of the photoelectric conversion portion PD during charge readout. The photoelectric conversion portion PD generates a signal charge corresponding to incident light, and retains and stores the generated signal charge. The signal storage portion FD has a capacity of temporarily retaining and storing the signal charge transferred from the photoelectric conversion portion PD. The photoelectric conversion portion PD and the signal storage portion FD have their respective ends grounded.

A transfer transistor TX for transferring the signal charge stored in the photoelectric conversion portion PD to the signal storage portion FD is connected in series between the other end of the photoelectric conversion portion PD and the other end of the signal storage portion FD. That is, the transfer transistor TX has its drain terminal and source terminal respectively connected to the other end of the photoelectric conversion portion PD and the other end of the signal storage portion FD. The transfer transistor TX has its gate terminal serving as an input portion connected to the vertical scanning circuit 24, and is supplied with a transfer pulse from the vertical scanning circuit 24 so that ON/OFF of the transfer transistor TX is controlled.

An amplification transistor TrA functions as an amplification unit, and amplifies a signal, based on the signal charge stored in the signal storage portion FD, to be inputted to its gate terminal and outputs the amplified signal from its source terminal. The amplification transistor TrA has its drain terminal connected to a voltage source Vdd. The gate terminal serving as an input portion of the amplification transistor TrA is connected to the source terminal of the transfer transistor TX. Further, the source terminal of the amplification transistor TrA is connected to a current source. Thus, the amplification transistor TrA, together with the voltage source Vdd and the current source, constitutes a source follower amplifier.

An FD reset transistor FDRST is used for resetting the signal storage portion FD and the input portion of the amplification transistor TrA. The FD reset transistor FDRST has its drain terminal and source terminal respectively connected to the voltage source Vdd and the source terminal of the transfer transistor TX. The FD reset transistor FDRST has its gate terminal serving as an input portion connected to the vertical scanning circuit 24, and is supplied with an FD reset pulse from the vertical scanning circuit 24 so that ON/OFF of the FD reset transistor is controlled. In such a configuration, the FD reset transistor FDRST and the transfer transistor TX are simultaneously turned on so that the photoelectric conversion portion PD can also be reset at the same time the signal storage portion FD is reset.

By such a configuration, the signal of the photoelectric conversion portion PD is temporarily stored once in the signal storage portion FD, is then amplified by the amplification transistor TrA, and is outputted toward the memory portion 22.

The memory portion 22 includes a capacitor C1, a switch SW1-1, a switch SW2-1, a memory m1 serving as an analog memory, a transistor TrB, and a switch SW3-1. Note that FIGS. 6 and 7 respectively illustrate configurations of the memory portion 22 when the tail of a sign of a switch, which needs to be conscious that control differs for each line number, is assigned "−1" so that the line number is 1. However, the tail of the sign may generally be assigned "−m" (m is an integer). A case of "−1" will be described below as a typical example.

The capacitor C1 has its one end connected to the source terminal of the amplification transistor TrA. The capacitor C1 has a capacity of clamping (fixing) a voltage level of an amplification signal to be outputted from the amplification transistor TrA. The other end of the capacitor C1 is connected to a drain terminal of the switch SW1-1 composed of a transistor.

The switch SW1-1 is a transistor for sampling and holding a voltage level at the other end of the capacitor C1 and retaining and storing the voltage level in the memory m1. The switch SW1-1 has its gate terminal connected to the vertical scanning circuit 24, and is supplied with a sample pulse from the vertical scanning circuit 24 so that ON/OFF of the switch SW1-1 is controlled.

The switch SW2-1 is a transistor for resetting the memory m1, and has its source terminal connected to a source terminal of the switch SW1-1 and has its drain terminal connected to a reference voltage Vref. The switch SW2-1 has its gate terminal connected to the vertical scanning circuit 24, and is supplied with a clamp and memory reset pulse from the vertical scanning circuit 24 so that ON/OFF of the switch SW2-1 is controlled.

The memory m1 has its one end grounded and has the other end connected to the source terminal of the switch SW1-1, and retains and stores an analog signal that has been sampled and held by the switch SW1-1. The memory m1 has a larger capacity than the capacity of the signal storage portion FD.

The transistor TrB is an amplification transistor functioning as an amplification portion, and amplifies a signal to be inputted to its gate terminal based on a signal charge stored in the memory m1 and outputs the amplified signal from its source terminal. The transistor TrB has its drain terminal connected to the voltage source Vdd. The gate terminal serving as an input portion of the transistor TrB is connected to the source terminal of the switch SW1-1. Further, the source terminal of the transistor TrB is connected to a current source via the switch SW3-1. Thus, the transistor TrB, together with the voltage source Vdd and the current source, constitutes a source follower amplifier.

The switch SW3-1 is a normal readout switch arranged on the normal connection line 34, and is a transistor for performing selection to output a signal of the analog memory m1 to the vertical signal line 33 via the normal connection line 34. The selected signal is transferred to the column parallel AD converter 23 via the vertical signal line 33. The switch SW3-1 has its drain terminal connected to the source terminal of the transistor TrB and has its source terminal connected to the current source. The switch SW3-1 has its gate terminal connected to the vertical scanning circuit 24, and is supplied with a selection pulse from the vertical scanning circuit 24 so that ON/OFF of the switch SW3-1 is controlled.

By such a configuration, a signal from the pixel portion 21 is temporarily stored in the memory m1, is amplified by the transistor TrB, and is outputted to the column parallel AD converter 23.

The column parallel AD converter 23 includes the plurality of ADCs (analog digital converters) 30 respectively corresponding to the vertical signal lines 33, as illustrated in FIG. 3.

First, when an analog pixel signal is outputted from the source terminal of the switch SW3-1, the outputted analog pixel signal is inputted to the comparator 30a in the ADC 30 via the vertical signal line 33. If an instruction signal from the control circuit 26 is applied to the comparator 30a when the analog pixel signal has been stabilized, the analog pixel signal is stored in the capacitor within the comparator 30a. Then, a reference voltage having a lamp waveform that changes in a slope shape, as described above, is inputted from the DAC 29 to the comparator 30a. Consequently, the comparator 30a compares a voltage of the analog pixel signal with the reference voltage, and reverses an output signal from the comparator 30a at a time point where a large/small relationship between the voltages has been reversed. The counter 30b digitally counts a period of time from a time point where the reference voltage starts to change in a slope shape to a time point where the output signal from the comparator 30a is reversed as an input clock number (by the function of the counter 30b, the analog signal is converted into a digital signal). When the counter 30b counts the analog pixel signal, however, up-counting is performed.

When a reset level signal is outputted from the source terminal of the switch SW3-1 and is inputted to the comparator 30a with the switch SW2-1 turned on, the outputted reset level signal is inputted to the comparator 30a in the ADC 30 via the vertical signal line 33. If an instruction signal from the control circuit 26 is applied to the comparator 30a when the reset level signal has been stabilized, a variation in a reset level of each of the pixels 31 and an offset voltage of the comparator 30a itself are stored in the capacitor within the comparator 30a. Then, a reference voltage having a lamp waveform that changes in a slope shape, as described above, is further inputted from the DAC 29 to the comparator 30a. The comparator 30a compares a voltage of the reset level signal with the reference voltage, and reverses an output signal from the comparator 30a at a time point where a large/small relationship between the voltages has been reversed. The counter 30b similarly counts a period of time elapsed until the output signal from the comparator 30a is reversed. When the counter 30b counts the reset level signal, however, down-counting is performed.

Therefore, a difference value obtained by subtracting a count result of the reset level signal from a count result of the analog pixel signal is retained in the counter 30b. That is, correlation double sampling (CDS) for removing a reset noise is performed.

The latch 30c retains the count result by the counter 30b. The latch 30c is connected to the horizontal readout circuit 25 and is controlled therein.

When a pulse is supplied from the horizontal readout circuit 25, the latch 30c is turned on and is electrically connected to the horizontal signal line 27, and the digital signal retained in the latch 30c is outputted to the sense amplifier circuit 28 and is amplified therein.

Then, an example of a circuit configuration relating to the focus detection pixel will be described below with reference to FIG. 7.

The focus detection pixel differs from the normal pixel illustrated in FIG. 6 in that the switch SW4 serving as the focus readout switch is added to the memory portion 22.

That is, a source terminal of a transistor TrB is branched into two, and one of them and the other are respectively connected to the switch SW3-1 and the switch SW4-1. While the switch SW3-1 is connected to the adjacent vertical signal line 33, the switch SW4-1 (generally, the switch SW4-m) is not necessarily connected to the adjacent vertical signal line 33, and may be extended to the spaced vertical signal line 33 and connected thereto.

The switch SW4-1 has a similar connection structure to that of the switch SW3-1 except that it may be extended to the appropriate vertical signal line 33.

The switch SW4-1 has its gate terminal connected to the vertical scanning circuit 24, and is supplied with a selection pulse from the vertical scanning circuit 24 so that ON/OFF of the switch SW4-1 is controlled.

When the normal pixel is read out, the selection pulse is supplied only to the switch SW3-1. In this case, both the normal pixel and the focus detection pixel are read out. On the other hand, if the normal pixel need not be read out and only the focus detection pixel need to be read out, the selection pulse is supplied only to the switch SW4-1. As described above, the switch SW4-1 is a switch for connecting only the focus detection pixel to the vertical signal line 33.

Note that the polarity of each of the above-mentioned transistors may be reversed so that the source terminal and the drain terminal of the transistors are made reverse to those described above. However, description is made, assuming that the input side and the output side are respectively a drain terminal and a source terminal. In the following description, a description that the switch is composed of a transistor is omitted, as needed.

Figure 8:
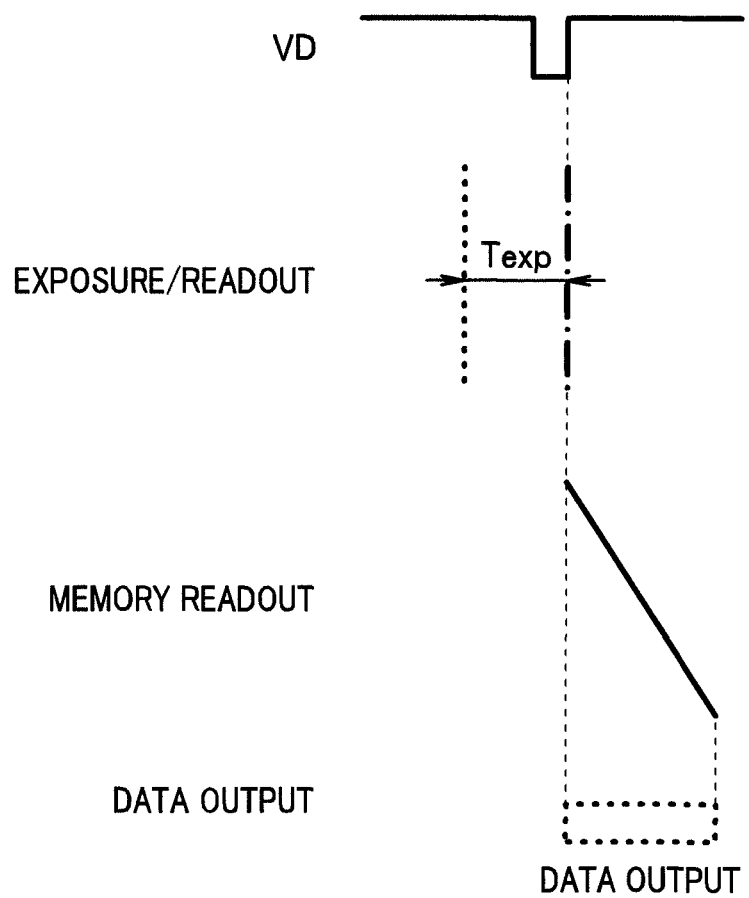
FIG. 8 is a diagram illustrating a basic image pickup operation of an image pickup unit for obtaining an image in the embodiment 1.
Figure 9:
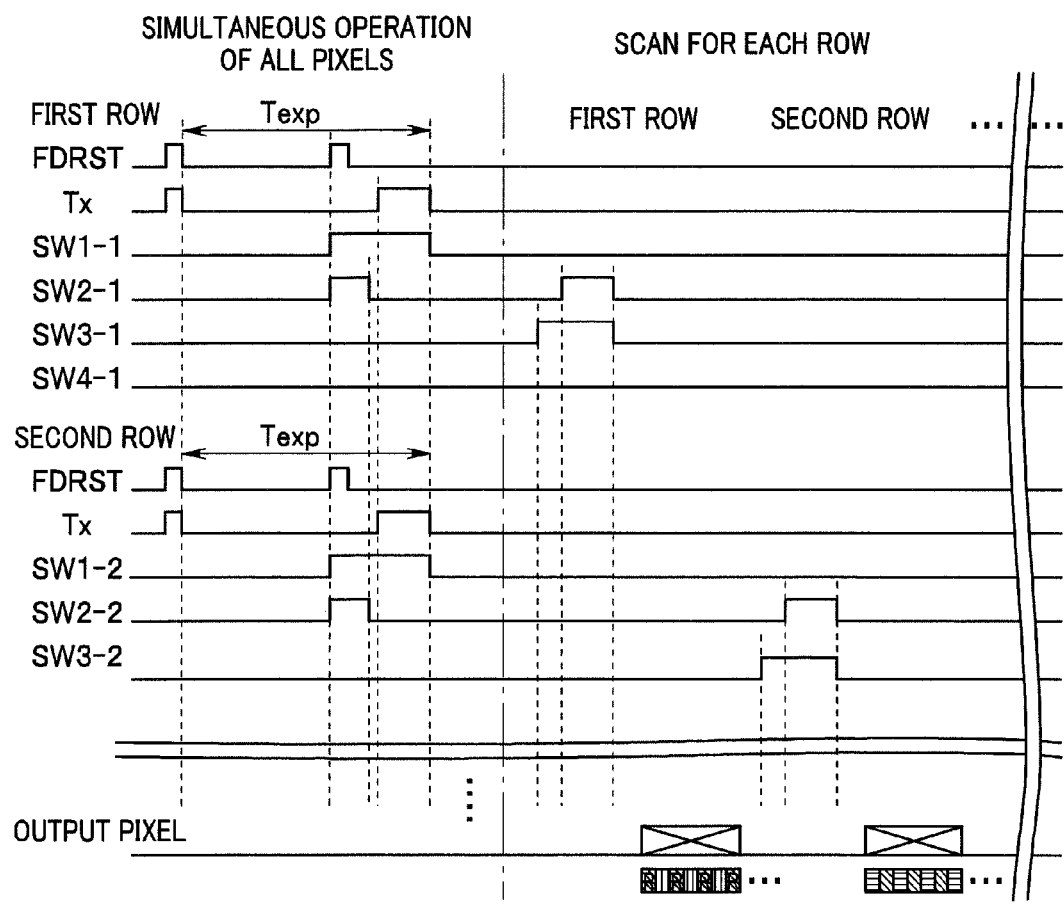
FIG. 9 is a timing chart illustrating an operation in first to second rows in a pixel portion performed when information about normal pixels and focus detection pixels are obtained in the embodiment 1.

Then, FIG. 8 is a diagram illustrating a basic image pickup operation of the image pickup unit 2 for obtaining an image, and FIG. 9 is a timing chart illustrating an operation in the first to second rows in the pixel portion 21 performed when information about the normal pixels and the focus detection pixels are obtained.

First, the camera control unit 12 previously sets an exposure time period Texp based on a light metering result.

The exposure control unit 9 simultaneously resets the photoelectric conversion portions PD in all the pixels in the image pickup device 2a at a time point going back by the exposure time period Texp from a rise timing of the vertical synchronizing signal VD (a global shutter system). The photoelectric conversion portion PD is reset by simultaneously turning on the FD reset transistor FDRST and the transfer transistor TX, as described above (see FIG. 9). At this time, the signal storage portion FD is simultaneously reset. A time point where the FD reset transistor FDRST and the transfer transistor TX are turned off is an exposure start time point.

Then, at a time point before the exposure time period Texp ends, the FD reset transistor FDRST is turned on to reset the signal storage portion FD, and the switch SW2-1 is simultaneously turned on to reset the memory m1 to the reference voltage Vref. At this time, the switch SW1-1 is further simultaneously turned on so that a potential at the other end of the capacitor C1 is reset to the reference voltage Vref while the switch SW1-1 starts to sample and hold the potential at the other end of the capacitor C1.

Then, the FD reset transistor FDRST is turned off so that the reset of the signal storage portion FD ends. The reset of the signal storage portion FD desirably ends immediately before the exposure time Texp ends to more effectively reduce noise due to a leak current.

Then, the switch SW2-1 is turned off so that the reset of the memory m1 ends. At this time point, the capacitor C1 clamps the amplification signal to be outputted from the amplification transistor TrA (the amplification signal after the reset of the signal storage portion FD).

Then, the transfer transistor TX is further turned on so that the signal charges stored in the photoelectric conversion portions PD in all the pixels are respectively transferred to the signal storage portions FD via the transfer transistors TX and stored in the signal storage portions FD.

Then, at a rise timing of the vertical synchronizing signal VD, the transfer transistors TX in all the pixels are turned off so that exposures of all the pixels (storage of signal charges) collectively (simultaneously) end.

The switch SW1-1 is turned off simultaneously with the transfer transistor TX being turned off so that sampling and holding of the potential at the other end of the capacitor C1 ends. Thus, signals stored in all the pixels in the pixel portion 21 are sampled and held in the memory m1 with correlation double sampling (CDS) performed for canceling a reset noise to be generated in the signal storage portions FD and a fixed pattern noise (FPN) due to a variation in a predetermined determination threshold level Vth to be generated in the amplification transistors TrA.

Then, the exposure control unit 9 sequentially causes the image signals sampled and held in the memory m1 to be read out in units of rows via the column parallel AD converter 23.

That is, the image signals corresponding to the first row out of the image signals stored in the memory m1 are respectively converted into digital signals, are subjected to CDS, and are sequentially outputted to the horizontal signal line 27, as described with reference to FIG. 3. The noise to be canceled by the CDS performed herein mainly includes the fixed pattern noise (FPN) due to the variation in the predetermined determination threshold level Vth to be generated by the transistor TrB and a noise caused by the ADC. If all the signal charges corresponding to the first row are read out via the horizontal signal line 27, the signal charges corresponding to the second row are similarly read out. This is repeated the number of times corresponding to all the rows so that the signal charges in all the pixels are read out.

Figure 10:
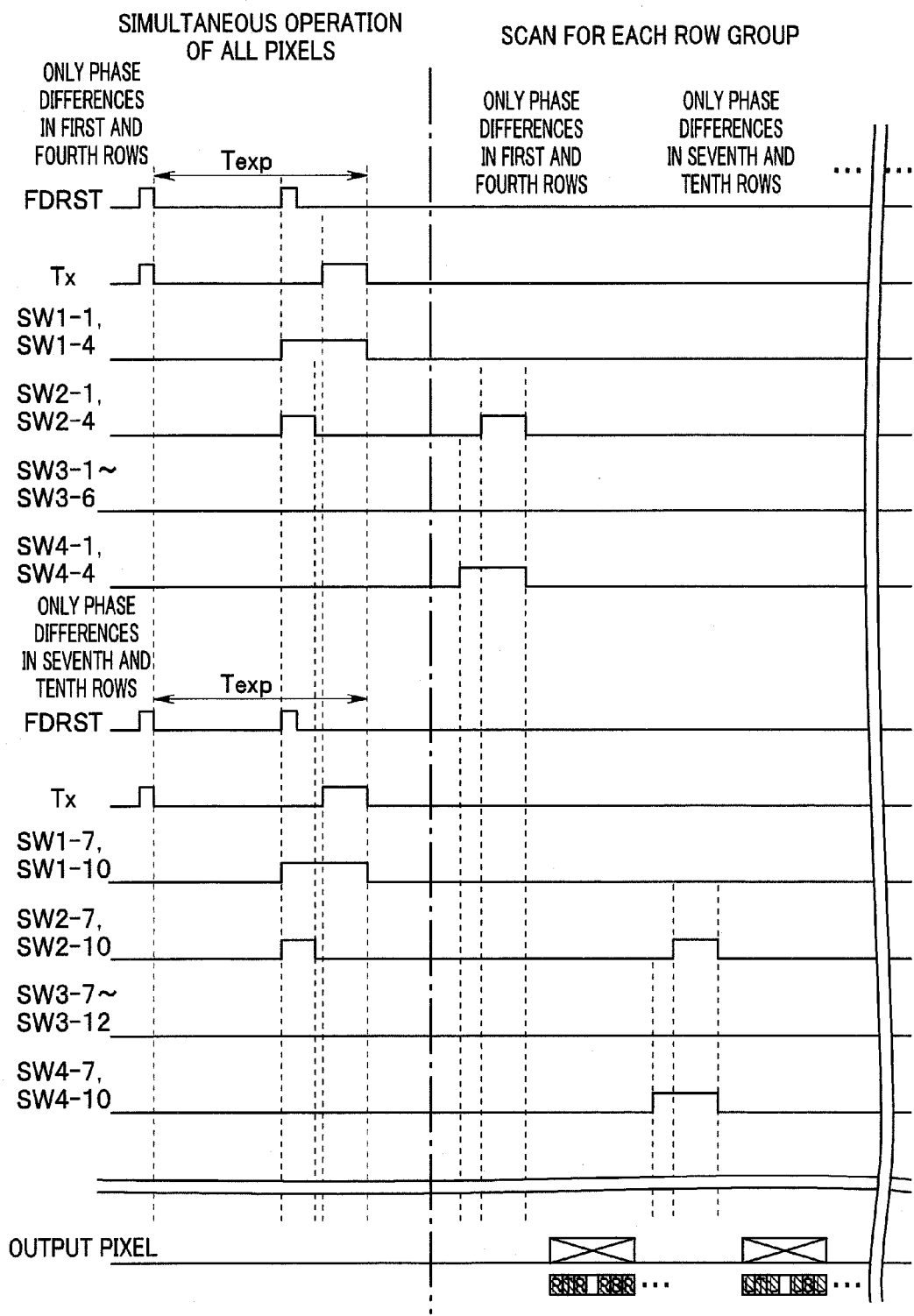
FIG. 10 is a timing chart illustrating an operation in a row group in a pixel portion performed when information about only focus detection pixels are obtained in the embodiment 1.

Then, FIG. 10 is a timing chart illustrating an operation in a row group in the pixel portion 21 performed when information about only the focus detection pixels are obtained.

Even if the normal pixels need not be read out and only the focus detection pixels are read out, processing by the pixel portion 21 is performed similarly to the processing illustrated in FIG. 9 (the processing performed when the information about the normal pixels and the focus detection pixels are obtained), and processing by the column parallel AD converter 23 is also performed similarly to the processing performed when the information about the normal pixels and the focus detection pixels are obtained. However, processing by the memory portion 22 differs from that performed when the information about the normal pixels and the focus detection pixels are obtained.

That is, when an image is obtained after the pixel portion 21 performs the above-mentioned exposure operation, all the pixels are read out for each row, as illustrated in FIG. 9. When the information about the focus detection pixels are obtained, however, only the focus detection pixels are read out for each row group, as illustrated in FIGS. 4, 5, and 10.

In the configuration illustrated in FIGS. 4 and 5, in the first readout performed in synchronization with the horizontal synchronizing signal HD, the focus readout switches SW4-1 and SW4-4 are simultaneously turned on/off so that a signal of the focus detection pixel R read out of the focus readout switch SW4-1 is outputted to the vertical signal line 33A or 33C and a signal of the focus detection pixel T or B read out of the focus readout switch SW4-4 is outputted to the vertical signal line 33B. Therefore, at this time, output pixels R, T, R, X, R, B, R, X, . . . ("X" indicates that a pixel output is missing) are read out in this order, respectively, to the vertical signal lines 33A to 33D, 33A to 33D, . . . (however, it is assumed that the pixel on the left side on the line is earlier read out in the pixel arrangement illustrated in FIGS. 4 and 5).

Then, in the second readout performed in synchronization with the horizontal synchronizing signal HD, the focus readout switches SW4-7 and 4-10 are simultaneously turned on/off so that a signal of the focus detection pixel L read out of the focus readout switch SW4-7 is outputted to the vertical signal line 33A or 33C and a signal of the focus detection pixel T or B read out of the focus readout switch SW4-10 is outputted to the vertical signal line 33B. Therefore, at this time, output pixels L, T, L, X, L, B, L, X, . . . ("X" indicates that a pixel output is missing) are read out in this order, respectively, to the vertical signal lines 33A to 33D, 33A to 33D, . . . .

The minimum repeating unit illustrated in FIG. 4 is spread over the focus detection area 21a. Thus, such processing is repeatedly performed when the information about all the focus detection pixels are obtained.

Note that when considered for only the focus detection area 21a, the total number of the focus detection pixels to be read out of the row group is smaller than the number of the vertical signal lines that pass through the focus detection area 21a in the first and second readout. That is, when only the focus detection pixels are read out, some of the vertical signal lines 33 have been unused, as described above. However, this does not prevent a further increase in efficiency by connecting the focus detection pixel to the vertical signal line 33 to which the switch SW4 has not yet been connected or the vertical signal line 33 outside the focus detection area 21a when the focus detection pixels are viewed within the same row group in the focus detection area 21a. For example, if total number of the focus detection pixels included in the row group takes the maximum value in a range in which it is not more than the number of all the vertical signal lines 33 included in the pixel portion 21, the maximum efficiency can be attained.

Figure 11:
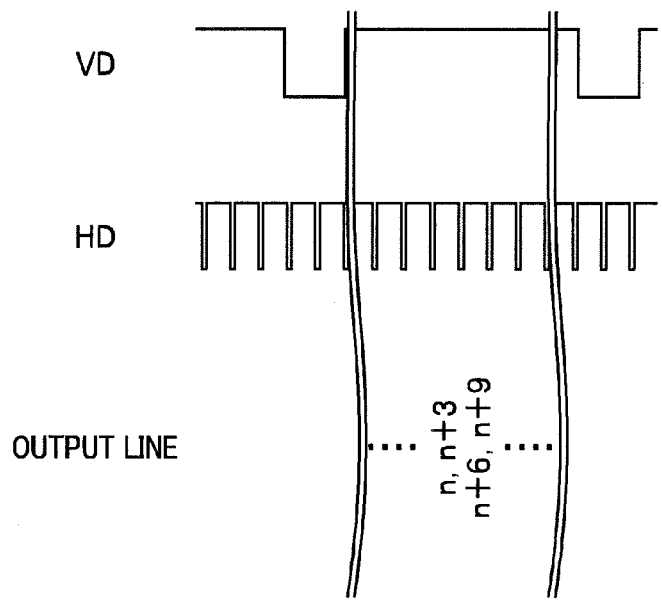
FIG. 11 is a timing chart illustrating, when readout for obtaining information about only focus detection pixels is performed, an example of lines to be outputted for each horizontal synchronizing signal.
Figure 12:
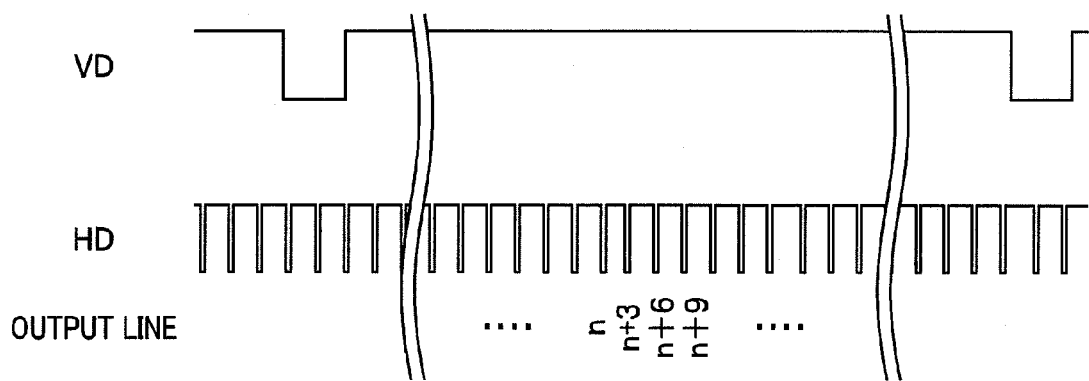
FIG. 12 is a timing chart illustrating, when similar readout for obtaining information about only lines including focus detection pixels to the conventional one is performed in the embodiment 1, an example of the line to be outputted for each horizontal synchronizing signal.

FIG. 11 is a timing chart illustrating an example of lines to be outputted for each horizontal synchronizing signal HD when readout for obtaining information about only the focus detection pixels is performed, and FIG. 12 is a timing chart illustrating an example of lines to be outputted for each horizontal synchronizing signal HD when similar readout for obtaining information about only lines including the focus detection pixels to the conventional readout is performed.

When the above-mentioned readout is performed, the n-th and (n+3)-th lines illustrated in FIG. 4 are read out in synchronization with a first horizontal synchronizing signal HD, and the (n+6)-th and (n+9)-th lines illustrated in FIG. 4 are read out in synchronization with a second horizontal synchronizing signal HD, for example. Thus, all the focus detection pixels in the minimum repeating unit are read out in response to the two horizontal synchronizing signals HD.

On the other hand, when similar readout to the conventional readout is performed, as illustrated in FIG. 12, four horizontal synchronizing signals HD are required to read out each of lines including the focus detection pixels.

Therefore, by the configuration according to the present embodiment, a period of time required to read out the focus detection pixels may be 50% of the conventional one, and a readout speed is increased to two times the conventional one. Further, while the column parallel AD converter 23 illustrated in FIG. 3 converts the pixel read out into a digital signal, the number of times of processing by the column parallel AD converter 23 in the configuration according to the present embodiment may be 50% of the conventional number of times. Thus, the processing by the column parallel AD converter 23 requiring power is significantly reduced. Therefore, the power consumption of the image pickup device can be efficiently reduced.

According to the embodiment 1, the focus detection pixels included in the row group are respectively connected to the different vertical signal lines 33 via the focus connection lines 35, and the focus readout switches SW4 are respectively provided on the focus connection lines 35 independently of the switches SW3 for respectively reading out the normal pixels and are simultaneously operated by the row group. Thus, the focus detection pixels corresponding to the plurality of rows can be read out in one readout operation. Therefore, a period of time for readout can be shorted, and the power consumption can also be reduced as the number of times of readout is reduced.

If the focus detection area 21a is densified, like in the present embodiment, is not densified but widened, or is both densified and widened (e.g., an arrangement ratio of the focus detection pixels is 12.5% in the present embodiment) in contrast with the conventional phase difference image pickup device (e.g., an arrangement ratio of focus detection pixels is 0.5%), a large number of focus detection pixels (corresponding to approximately 20 times the conventional focus detection pixels in the present embodiment) need to be read out. However, the configuration according to the present embodiment enables a practical readout speed to be ensured even in such a case.

The focus detection pixels included in the row group are respectively connected to the different vertical signal lines 33. Thus, the signals to be outputted from the focus detection pixels are not mixed.

Particularly in the configuration according to the present embodiment, the column parallel AD converter 23 requiring power is provided. Thus, the number of times of the readout is reduced so that the power consumption can be efficiently reduced.

While a plurality of desired rows can also be combined to constitute a row group, useless complexity in circuit design or signal processing can be more avoided when the plurality of continuous rows constitute a row group than when the discontinuous rows constitute a row group.

Further, if the total number of the focus detection pixels included in the row group is set to take the maximum value in a range in which it becomes not more than the number of the vertical signal lines 33, the number of times of the readout is minimized so that efficiency can be enhanced.

The focus detection pixels arranged in different places can respectively be connected to the unused vertical signal lines, as described above, from a viewpoint of further increasing the speed. However, in the case, the focus connection lines 35 are set so that the total length of the focus connection lines 35 becomes the shortest, the circuit design is simplified while noises to be mixed from the signal lines can also effectively be reduced.

If the focus detection pixels include the R pixels and L pixels, a phase difference in the horizontal direction can be detected so that the focus of an object that changes in pattern in the horizontal direction can be detected with high accuracy. Further, if the focus detection pixels include the T pixels and B pixels, the focus of an object (i.e., an object the focus of which is not easily detected by the R pixels and the L pixels) can also be detected with high accuracy so that the object hardly changes in pattern in the horizontal direction but changes in pattern in the vertical direction.

In the primary color Bayer array, the green pixels, the number of which is two times those of the red pixels and the blue pixels, are arranged. Thus, the focus detection pixels are arranged at only the positions of the green pixels so that the resolutions of red and blue components, the respective numbers of which are small, are not reduced. Moreover, the focus detection pixels are discretely (not densely) arranged at the positions of the green pixels so that green components at the positions where the focus detection pixels are disposed can easily be obtained by being interpolated from the green pixels in the vicinities thereof.

Focus detection is performed based on the signals read out of the focus detection pixels in the image pickup device 2a having the above-mentioned configuration, as described above. Thus, a high-speed and low-power consumption focus detection apparatus is obtained.

Note that while a case where the global shutter operation is performed as a shutter operation has been described above by way of example, the present invention is not limited to such a shutter operation. For example, the present invention can also be combined with a currently general rolling shutter operation. In this case, transfer to the memory m1 is performed using a rolling operation so that a timing of readout from the memory m1 may be optimally designed. While the degree of difficulty in design is increased, the present invention can also be implemented in principle on the photoelectric conversion portion PD without via a memory. Further, the present invention can, of course, be combined with a case where respective operation timings of the transfer transistor TX and the FD reset transistor FDRST during reset do not completely match those during transfer (e.g., a case of a pseudo global shutter operation with delay intervals of several clocks).

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup device including a plurality of pixels arranged in a matrix shape, comprising:
   a plurality of vertical signal lines, respectively provided to correspond to all columns, to each of which the pixels in one of the columns are connected, respectively, via normal connection lines;
   a plurality of focus detection pixels discretely arranged among the plurality of pixels arranged in a matrix shape over a plurality of rows and a plurality of columns;
   a vertical scanning circuit that sets a plurality of row groups each of the row groups comprising a plurality of rows and being set in a range in which a total number of the focus detection pixels included in each of the row groups is not more than a number of the vertical signal lines;
   focus connection lines that are different from normal connection lines of the device and respectively connect all the focus detection pixels included in the row group to the different vertical signal lines;
   focus readout switches respectively provided on the focus connection lines
   wherein the vertical scanning circuit that causes the focus readout switches to simultaneously operate by a unit of the row group.

2. The image pickup device according to claim 1, wherein the row group includes a plurality of continuous rows.

3. The image pickup device according to claim 1, wherein the row group is set to take a maximum value in the range in which the total number of the focus detection pixels included in the row group is not more than the number of the vertical signal lines.

4. The image pickup device according to claim 1, wherein the focus detection pixels include R pixels and L pixels for detecting a phase difference in a row direction, each of the R pixels photoelectrically converting a light beam that passes through a right side of a pupil of a lens, and each of the L pixels photoelectrically converting a light beam that passes through a left side of the pupil of the lens.

5. The image pickup device according to claim 4, wherein the focus detection pixels further include T pixels and B pixels for detecting a phase difference in a column direction, each of the T pixels photoelectrically converting a light beam that passes through an upper side of the pupil of the lens and each of the B pixels photoelectrically converting a light beam that passes through a lower side of the pupil of the lens.

6. The image pickup device according to claim 1, wherein the image pickup device is a color image pickup device including color filters in a primary color Bayer array, and the focus detection pixels are discretely arranged only at positions of green pixels in the primary color Bayer array.

7. The image pickup device according to claim 1, further comprising a column parallel AD converter for simultaneously converting analog signals to be respectively transmitted through all the vertical signal lines into digital signals.

8. A focus detection apparatus, comprising:
   the image pickup device according to claim 1; and
   a focus detection unit that detects a focus based on signals read out of the focus detection pixels in the image pickup device.

* * * * *